Sept. 23, 1952  A. CASABONA ET AL  2,611,892
LANDING INFORMATION RECEIVING SYSTEM
Filed April 17, 1948  9 Sheets-Sheet 1

INVENTORS
ANTHONY CASABONA
GUS STAVIS
BY
*R P Morris*
ATTORNEY

Sept. 23, 1952    A. CASABONA ET AL    2,611,892
LANDING INFORMATION RECEIVING SYSTEM
Filed April 17, 1948    9 Sheets-Sheet 2

INVENTORS
ANTHONY CASABONA
GUS STAVIS
BY
ATTORNEY

Fig. 3.

| | LEFT OF COURSE | ON COURSE | RIGHT OF COURSE |
|---|---|---|---|
| TERMINAL 14 (SEE FIG.2) | | | |
| TERMINAL 15 | | | |
| TERMINAL 17 | | 1-2 | |
| TERMINAL 16 | | 1+2 | |
| OUTPUT OF 18 | | | |
| TERMINAL 29 | | | |
| TERMINAL 28 | | | |
| TERMINAL 31 | | 6+7 | |

Sept. 23, 1952. A. CASABONA ET AL 2,611,892
LANDING INFORMATION RECEIVING SYSTEM
Filed April 17, 1948 9 Sheets-Sheet 4

INVENTORS
ANTHONY CASABONA
GUS STAVIS
BY
ATTORNEY

Sept. 23, 1952  A. CASABONA ET AL  2,611,892
LANDING INFORMATION RECEIVING SYSTEM
Filed April 17, 1948  9 Sheets-Sheet 7

INVENTORS
ANTHONY CASABONA
GUS STAVIS
BY
ATTORNEY

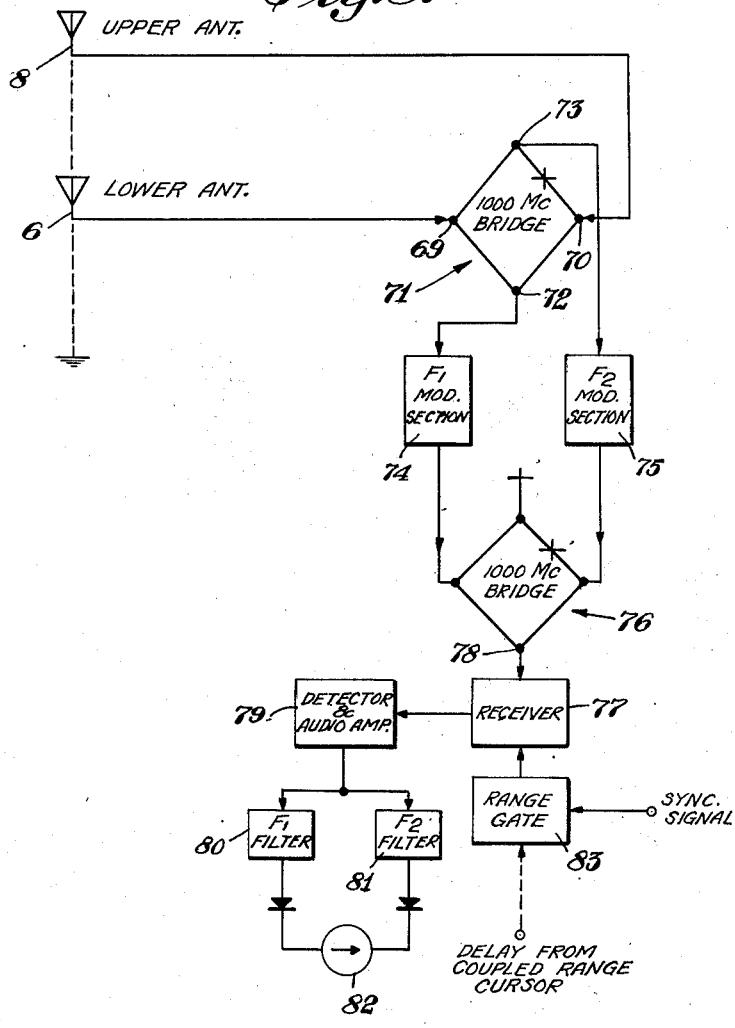

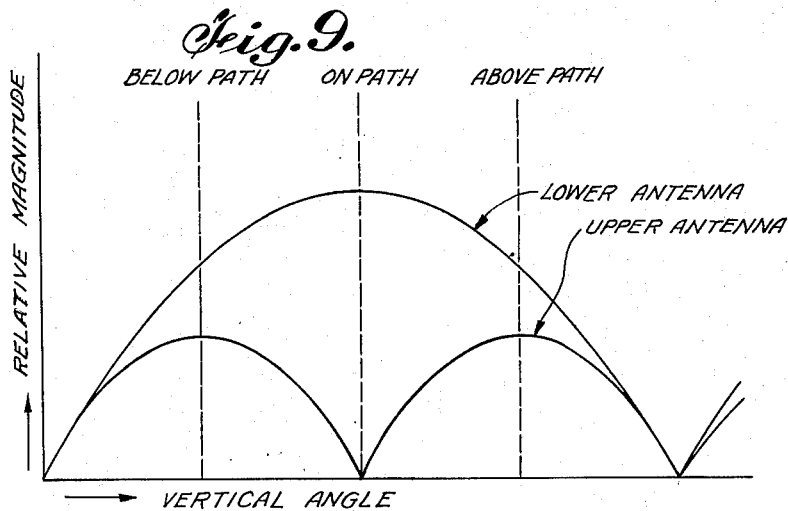

Patented Sept. 23, 1952

2,611,892

UNITED STATES PATENT OFFICE 2,611,892

LANDING INFORMATION RECEIVING SYSTEM

Anthony Casabona, Hawthorne, and Gus Stavis, Ossining, N. Y., assignors to International Standard Electric Corporation, New York, N. Y., a corporation of Delaware Application April 17, 1948, Serial No. 21,654

9 Claims. (Cl. 343—11)

1

This invention relates to radio navigation systems and particularly to an arrangement for determining the position of a mobile craft relative to a given course.

Radiant energy systems for guiding mobile craft, such as aircraft, with respect to a prescribed course are well known. In locations wherein considerable aircraft traffic is experienced, as in connection with the landing of aircraft on a runway, it is desirable that the information given to mobile craft to enable it to make an instrument landing be reproduced on the ground for purposes of monitoring, traffic control, and for emergency talk-down procedure. Normal operation of ground equipment providing these facilities is usually derived from the pulse response of an aircraft, either of the cooperative or passive type.

An object of this invention is to provide a novel arrangement for processing pulse energy radiated from a mobile craft to obtain its position with respect to a prescribed course.

In accordance with an embodiment of our invention, a receiving system for pulse energy, as for example, radiant energy pulses radiated from a mobile craft such as an aircraft, comprises two antennas which are installed one on each side of the runway in the vicinity of the point of contact for landing for providing azimuth tracking of the aircraft. The antennas are spaced apart a desired fraction of a wave length which determines the sub-carrier frequency component of the pulse envelope to be used. The energy from each antenna is received in individual receivers. The output from each antenna after passage through processes of combining, phasing and modulation by modulating waves from a local source provides a resultant output in the form of modulated sub-carrier energy corresponding to the time interval of the pulsed output of each of the receivers. Indicating means are then provided for comparing the amplitude of the two modulations of the modulated sub-carrier energy for obtaining the aircraft's azimuth. For providing elevation tracking of the aircraft, an elevation antenna system corresponding to a glide path radiation is provided on one side of the runway. The elevation system comprises two antennas spaced apart in the vertical. The pulse energy received by each of said glide path antennas after processes of combining, and modulation by local modulation waves provides a resultant output which when applied to an indicator provides the desired elevation tracking control.

2

The above-mentioned and other features and objects of the invention will become more apparent and the invention itself, though not necessarily defined by said features and objects, will be clearly understood by reference to the following description of an embodiment of the invention taken in connection with the accompanying drawings wherein:

Fig. 3 represents a vectorial analysis of the operation of the system of Fig. 2;

Fig. 8 shows a receiving system for obtaining elevation indications of a landing aircraft;

Fig. 9 shows a vectorial analysis of the operation of the glide path arrangement of Fig. 8.

Figure 1:
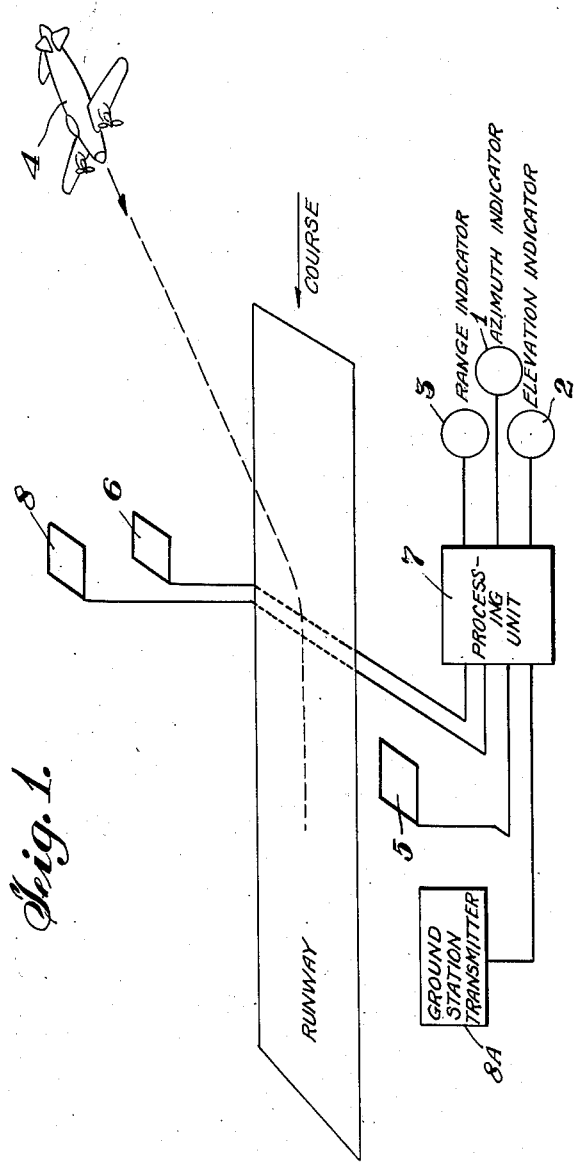
Fig. 1 shows an arrangement for determining the position of aircraft relative to providing landing information.

Referring to Fig. 1 there is shown a radio navigation system for providing azimuth 1, elevation 2, and range 3, indications of an aircraft 4 being directed to a landing on the runway. Two antennas 5 and 6 are provided spaced symmetrically to each side of the runway in the vicinity of the point of contact, for receiving radiant energy pulses radiated from the aircraft 4 desiring to make a landing on said runway. The output of antennas 5 and 6 upon processing in the unit 7 yields the azimuth position of the craft. The elevation position of the craft is obtained from the output of two radiators spaced apart vertically, and mounted on one side of the runway. In Fig. 1, the elevation antennas comprise antenna 8 and one of the azimuth antennas 6. The original source of the radiant energy pulses may be the aircraft itself, or a ground station transmitter system 8A. The ground station may provide the energy, for example, in the form of pulsed carrier frequency energy which may be radiated from one of the receiving antennas or from a beamed antenna of its own and is reverted from the aircraft 4 to the receiving antennas 5, 6 and 8. The sub-carrier frequency is derived as a component of the pulse modulation. By utilizing a ground station for the original source of pulse energy to be reverted by the aircraft, the range of the craft may also be conveniently obtained.

Figure 2:
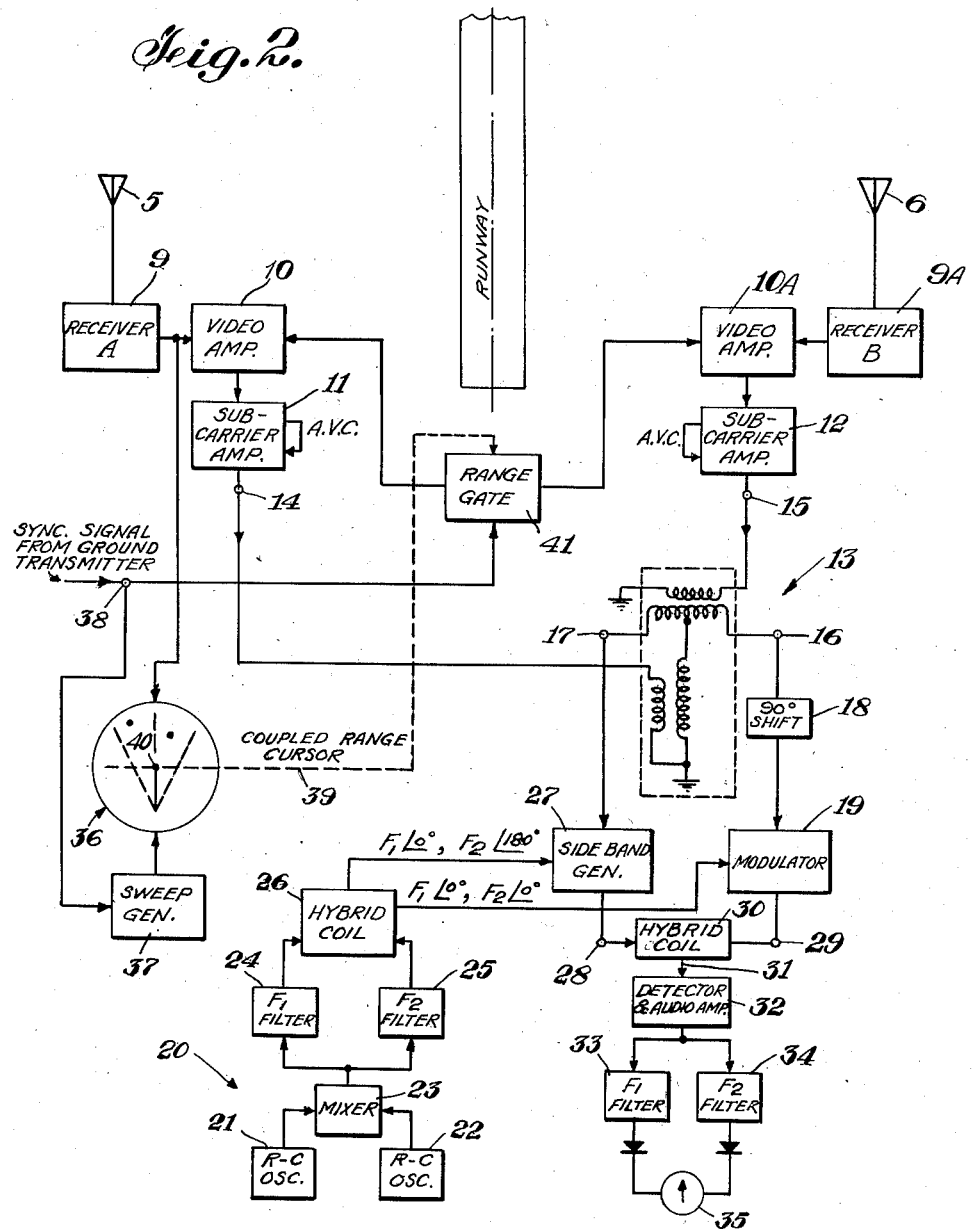
Fig. 2 shows in block diagram form one receiving system for obtaining azimuth-range indications of a landing aircraft.

Referring to Fig. 2, there are shown two antennas 5 and 6 spaced symmetrically to each side of the runway in the vicinity of the point of contact, for receiving radiant energy pulses radiated from an aircraft desiring to make a landing on said runway. The ground station 8A of Fig. 1 provides pulse modulated carrier frequency energy which is reverted from the aircraft 4 to the receiving antennas 5 and 6 of Fig. 2. The carrier frequency for this system is of no concern and can be any frequency adaptable to radar technique. However, it is desirable that the spacing between the antennas 5 and 6 be slightly less than a half wave length at the sub-carrier frequency to provide the desired pattern formation. The energy from each antenna 5 and 6 is received in the individual receivers 9 and 9A, respectively. The carrier frequency pattern is not detected, but the demodulated pulse output from each receiver is passed through separate video amplifier circuits 10 and 10A to respective tuned sub-carrier amplifier circuits 11 and 12 which detect the sub-carrier component of the pulse. The pulse repetition rate and pulse width should preferably be chosen so as to favor the sub-carrier frequencies. The relative phase of the continuous wave energy being delivered by each sub-carrier amplifier is determined by the relative timing of the exciting pulses. The two sub-carrier amplifier outputs are mixed in a hybrid type transformer bridge 13 such that the energies being delivered by terminals 14 and 15 are added at terminal 16 and subtracted at terminal 17. The resultant energy at terminal 16, after being phase shifted 90° in circuit 18, is modulated with equal amounts of modulating frequency waves $F_1$ and $F_2$ in modulator 19. The modulating frequency waves $F_1$ and $F_2$ are derived from a modulating frequency source such as 20. Source 20 comprises two resistance-capacitance oscillators 21 and 22, whose distinct outputs are mixed in the mixer circuit 23 in such a manner whereby their sum produces the frequency $F_1$ after passage through the filter 24 and their difference produces the frequency $F_2$ after passage through the filter 25. The $F_1$ and $F_2$ waves from the filters are then applied through the hybrid coil arrangement 26 whereby one output consists of $F_1$ and $F_2$ waves in their original phase, and the other output consists of $F_1$ waves in the original phase and $F_2$ waves 180° out of phase with the original phase. The energy at the terminal 17 is applied to a sideband generator 27 producing at terminal 28 sidebands of $F_1$ and $F_2$ with no carrier. The sidebands contained in the sideband generator output are 90° out of phase with those generated in the modulator 19 and available at terminal 29. The outputs of the modulator 19 and sideband generator 27 are combined in the hybrid coil arrangement 30. After combination the total energy at terminal 31 is detected in 32, filtered in 33 and 34, and displayed on a cross pointer type meter 35, or any other adaptable indicating device.

An analysis of the operation of the system is shown vectorially in Fig. 3. Assuming the airplane to be on-course, the reflected pulses will arrive at antennas 5 and 6 simultaneously so that the sub-carrier frequency appears in phase at terminals 14 and 15. These need not necessarily be of the same magnitude and, in the analysis, a ratio of 2 to 1 was chosen for these energies. Referring to the on-course analysis, the energies at the output terminals of the bridge 17 and 16 are shown to be in phase. After modulation, the resulting phase of the carrier and sideband components at terminals 28 and 29 is shown. These are mixed and the resulting vector diagram for the output at terminal 31 shows equal amounts of amplitude and phase modulation of $F_1$ and $F_2$. Although the detector will disregard the phase modulation, it is of interest to note that equal amounts exist. Hence an on-course indication is obtained. If the levels at terminals 14 and 15 are adjusted to be equal, then the energy at terminal 17 will be zero and no phase modulation will exist.

When the aircraft is to the left of course, the energy at 5 will lead the energy at 6. The vector analysis shows that under these conditions a predominance of $F_2$ modulation will produce the desired off-course indication. Again some phase modulation exists because of the differences in magnitude of the two initial energies. When these are equal the vectors will assume orthogonal positions and the phase modulation will disappear. The vector analysis for the aircraft to the right of course shows a predominance of $F_1$ modulation producing an off-course indication to the opposite side. Hence normal localizer operation is obtained.

The sub-carrier amplifiers may be provided with automatic volume control so as to maintain the energy on both sides equal as far as possible. This AVC may be operated from a reference level so that gains on each side will adjust themselves for equal output.

The sharpness of the system can be increased by the use of several harmonic frequencies of the sub-carrier in addition to the sub-carrier.

As mentioned previously, all that is necessary for the operation of the system is that the aircraft be illuminated with pulsed energy. The response received at one antenna, such as 5, may also be used in an oscilloscope display 36 so as to detect the presence and range of each aircraft in the approach area. If a sector swept, narrow beam transmitting antenna is used, the oscilloscope display may be of the PPI type having its sweep generator 37 triggered by a synchronizing signal from the ground transmitter 8a of Fig. 1 as applied to terminal 38. A range cursor 39 may be then used to pick out any aircraft for example 40 in the approach area. The range gate 41 is coupled to terminal 38 and only permits the passage of pulses from the chosen aircraft and its position is shown on the cross-pointer meter 35. The modulating system may be duplicated so that several aircraft can be gated in and simultaneous position readings obtained. In the case of sector swept transmission, it is necessary for the indicator to have persistency since the airplane is illuminated for only a portion of the sweep time.

Figure 4:
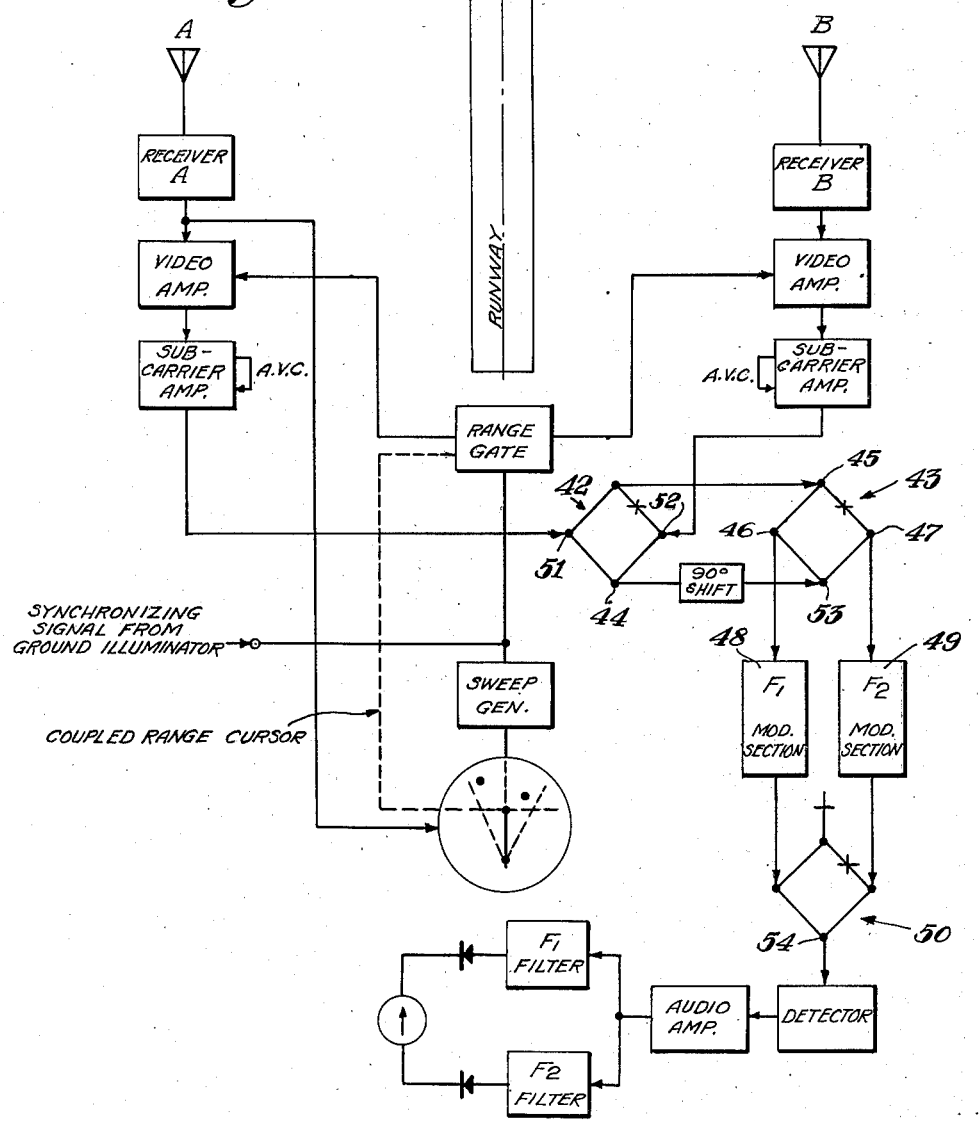
Fig. 4 shows in block diagram form a second receiving system for obtaining azimuth indications of a landing aircraft.
Figure 5:
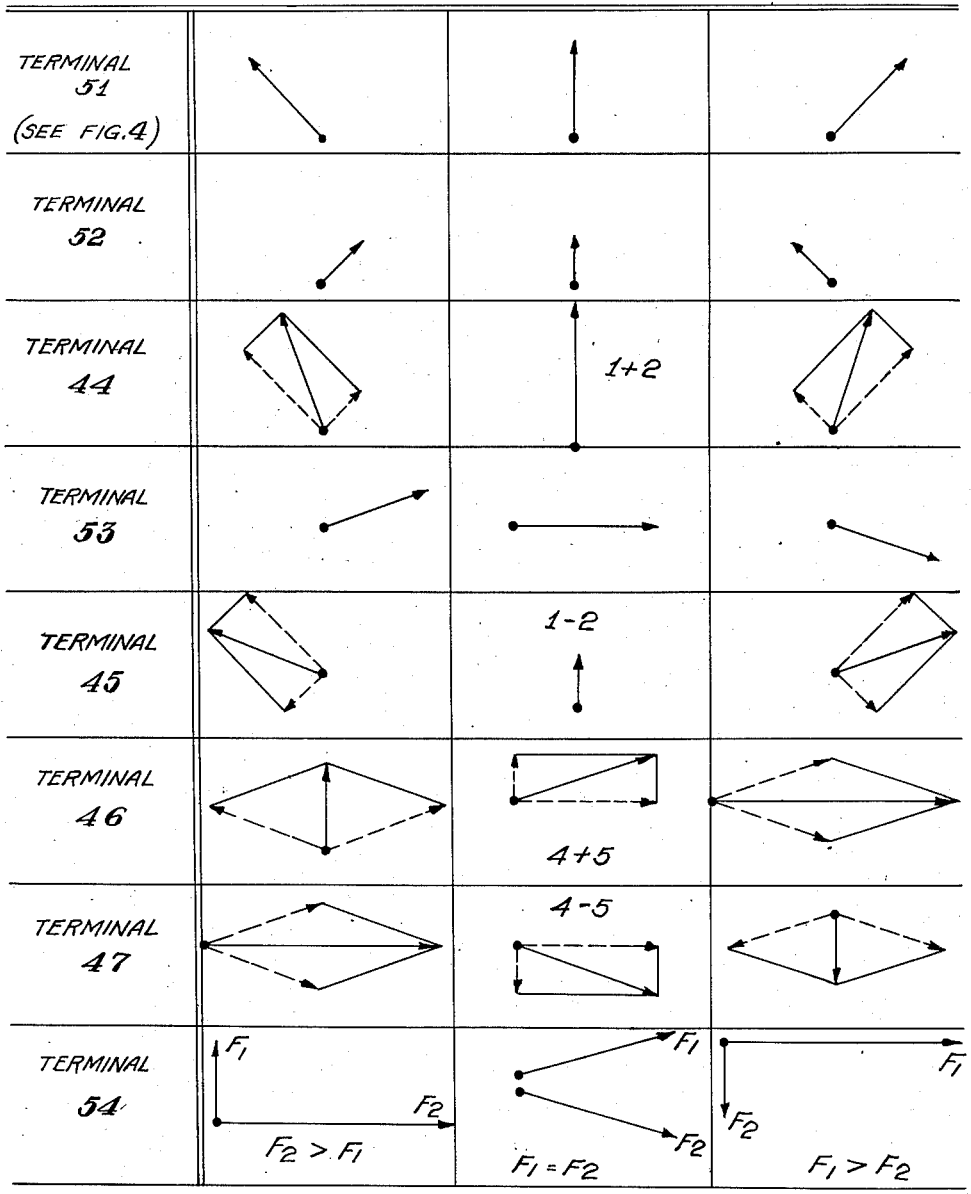
Fig. 5 shows a vectorial analysis of the operation of the system of Fig. 4.

A second general method for obtaining localizer operation is illustrated in Fig. 4. Here, two bridges 42 and 43 are used before modulation in order to isolate the sub-carrier reception patterns. The energy at terminal 44 contains the in-phase components of the energies from both sides, which is representative of one pattern. Terminal 45 contains an out of phase component from both sides and therefore gives another pattern. When these are mixed in the second bridge 43, terminals 46 and 47 will deliver equal magnitudes only when the other pattern goes through its null. This occurs when the aircraft is reflecting energy from an on-course position. The equal energies are modulated in 48 and 49 with F1 and F2 respectively and after detection the required on-course indication results. If the aircraft is to either side of the course, terminals 46 and 47 will deliver unbalanced energy alternately and one section will receive more energy than the other. The lower bridge 50 is used for combining energy and to prevent cross modulation. The vector analysis of the system is shown in Fig. 5, reference being had to the energies at terminals 44—47 and 51—54. As before, unequal response of the two stations results in some phase modulation and a subsequently wider course, but does not shift its position.

Figure 6:
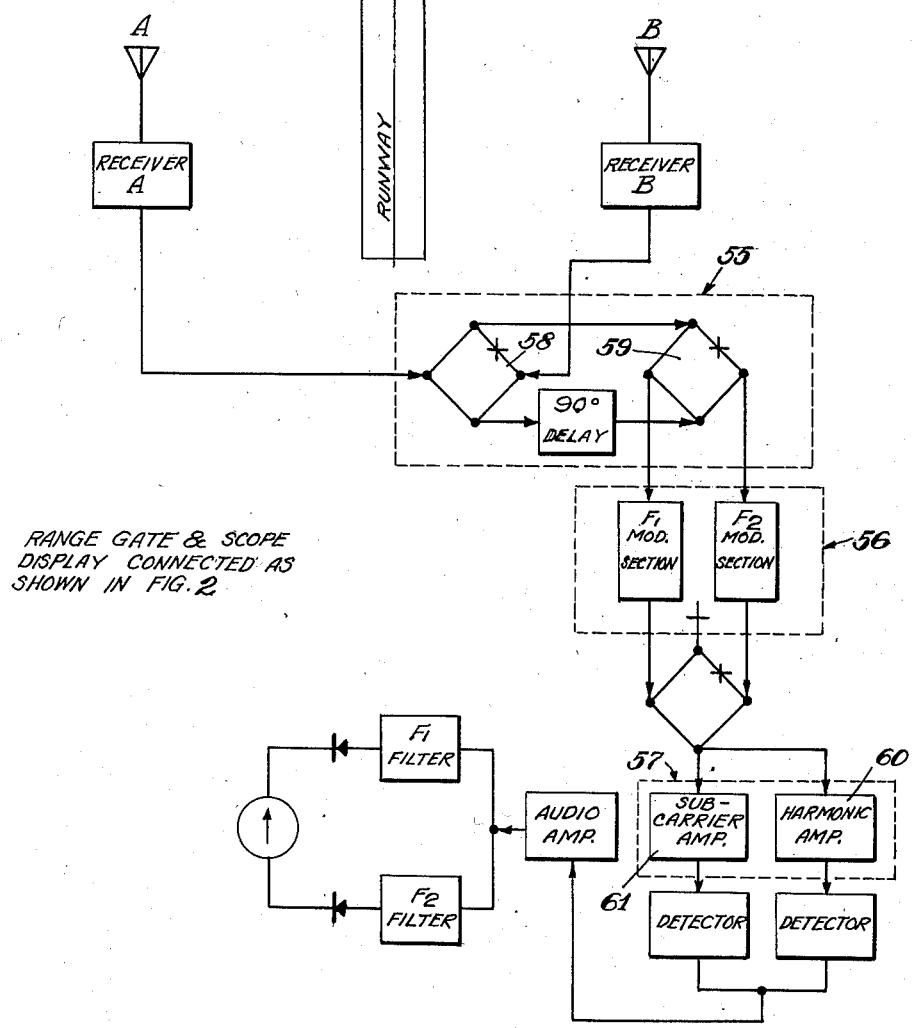
Fig. 6 shows in block diagram form a third receiving system for obtaining azimuth indications of a landing aircraft.

Fig. 6 shows a system which is essentially the same as that just described except that the combining in circuits 55 and modulating in circuits 56 is done on the pulsed energy before the pulses excite the sub-carrier amplifier circuits 57. Although this makes it necessary for the bridges 58 and 59 and modulator circuits 56, to be wide band, the advantage is gained that only one sub-carrier amplifier or filter is used, resulting in greater stability of the system. The block diagram of Figure 6 also shows how a harmonic amplifier 60 may be connected in order to produce a sharper course. The compromise between clearance and sharpness can be effected by adjusting the relative gains of the sub-carrier amplifier 61 and the harmonic amplifier 60.

The bridges 58 and 59 shown in Fig. 6 may be transformer bridges of the type shown in Fig. 2. If wide band video transformers are used, the bridge will pass the pulses essentially undistorted. Rotating goniometers can be used for the modulating circuits 56 and again these can be made to pass a video band.

Figure 7:
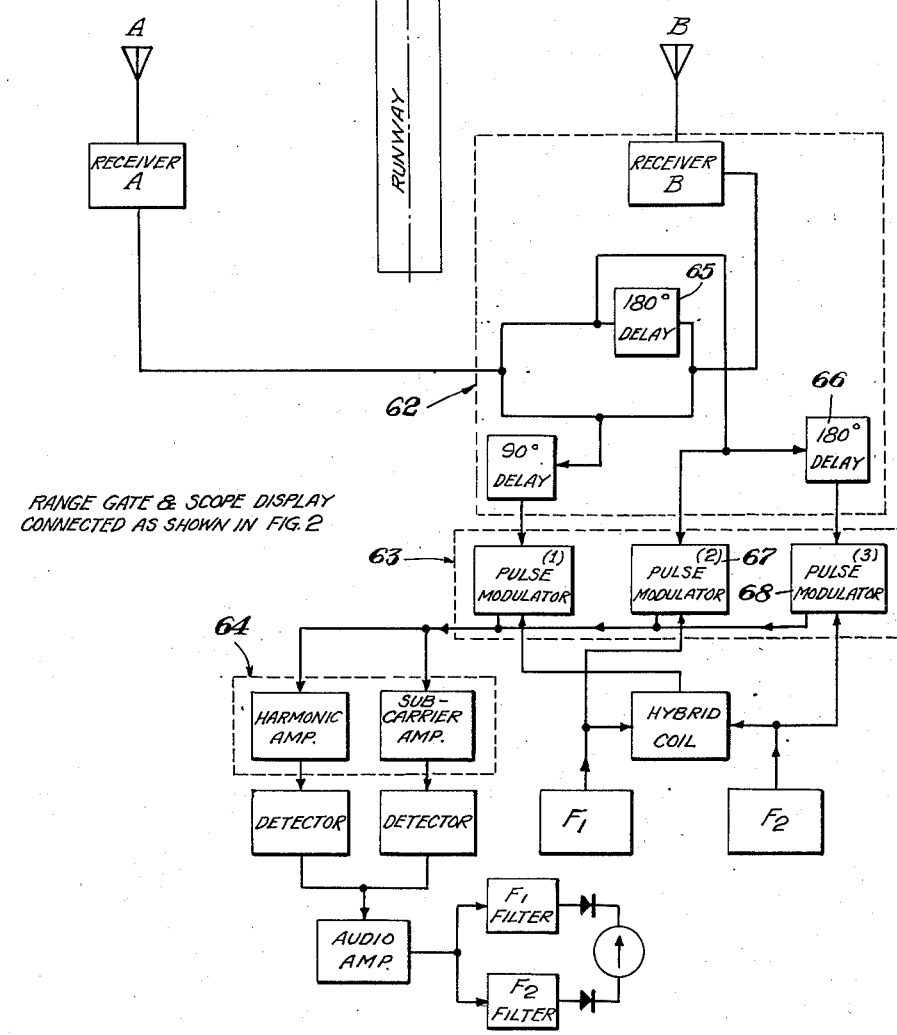
Fig. 7 shows in block diagram form a fourth receiving system for obtaining azimuth indications of a landing aircraft.

If electronic modulation is desired the system of Fig. 7 may be used. This system is essentially similar to that of Fig. 2 with the exception that again the combining in circuits 62 and modulation in circuits 63 is accomplished before the pulses excite the sub-carrier amplifier circuits 64, hence all components before the amplifier must be wide band. Delays of 180° at the sub-carrier frequency 65 and 66 are shown in the mixing circuits 62 but these can be replaced by cross-overs or polarity reversals of the pulse energy. This type of operation would allow the use of the wide band transformer bridges discussed above. Pulse modulators 67 and 68 operate essentially as a side band generator. They are excited out of phase because of delay 66 and the outputs when mixed will contain only sidebands of the modulating frequencies. The vector analysis of the system, therefore, is essentially the same as that shown in Fig. 3.

The block diagram of Fig. 8 shows a method for obtaining elevation information from pulsed energy reverted from aircraft to be landed. The received energy from the upper and lower antennas 6 and 8 is fed to the two input terminals 69 and 70 of a carrier frequency bridge 71. The output terminals 72 and 73 of the bridge are connected to modulators 74 and 75 so that each output is modulated by F1 and F2 respectively. The energies are combined in a cross modulation bridge 76 and the receiver 77 is connected to the output terminal 78 of this bridge. After detection in 79 and filtering in 80 and 81 the elevation information is displayed on a cross-pointer indicator 82. A range gate 83 coupled to the cursor on a scope display may be provided as in Fig. 2 to select a desired craft at a given elevation. The operation of the system is shown in Fig. 9. When the aircraft is on path, the upper antenna 8 will receive no energy; hence there will be no input to terminal 70 of the upper bridge. The energy at terminal 69 will divide equally at terminals 72 and 73; thereby equal energy passes through each modulating section 74 and 75. After detection in 79 an on-path indication is obtained. When the aircraft is below path, the upper antenna 80 will receive energy which is phased and added to that of terminal 69, producing the sum at terminal 72 and the difference at terminal 73. Under these conditions, the F1 modulating section 74 will be fed more power than the F2 section 73, and the cross-pointer meter 82 will indicate that the aircraft is below the path. When the aircraft is above the path, the upper antenna 8 will receive energy opposite in phase to that of the previous case. Hence terminal 73, will deliver more energy than terminal 72 and a predominance of F2 signal will exist after detection, indicating the aircraft to the above path.

The antenna used in the transmission of the pulse energy from the ground station 9 can be separate or as shown in Fig. 1 can also act as an azimuth or elevation receiving antenna. Furthermore the azimuth and elevation antennas may be separate or comprise common elements as shown in Fig. 1. Although the source of pulse energy has been illustrated as originating from a ground station in the vicinity of the ground receiving apparatus, the present system is capable of providing azimuth and elevation bearings of a landing aircraft if the aircraft itself is the source of original pulse energy.

It should be mentioned that actual modulation of the pulses, radiated from the craft, with sub-carrier frequency energy may be feasible. In the present arrangement this becomes impractical since the pulse would have to be very wide in order to accommodate several cycles of the sub-carrier frequency modulations. However, in other arrangements, by closely spacing the two receiving antennas, as for example, at the end of the runway, this latter mentioned method may be utilized.

While I have described above the principles of our invention in connection with specific apparatus, and particular modifications thereof, it is to be clearly understood that this description is made only by way of example and not as a limitation on the scope of my invention.

What is claimed is:

1. A receiving system for pulse energy radiated from a remote craft to be guided along a prescribed course, comprising two antennas spaced apart transversely of said course, means for combining the pulse energy received by each of said antennas to provide sum and difference output components thereof, a source of separate modulation waves, means for separately modulating each of said component outputs with separate ones of said waves, means for combining said two modulated outputs, means for demodulating said two modulated outputs to obtain the modulation components thereof, indicator means, and means for applying the modulation components to said indicating means for indicating the direction of said craft.

2. A receiving system for pulse energy radiated from a remote craft to be guided along a prescribed course comprising two antennas spaced apart a given fraction of a wave length at a sub-carrier frequency and mounted one on each side of said course, means for detecting the sub-carrier frequency components of the pulse energy received by each of said antennas, means for combining said detected components to provide sum and difference component outputs thereof, means for providing a phase displacement between each of said component outputs, a source of modulation waves, means for applying said waves in given phase relationship for separately modulating each of said component outputs after said phase displacement, means for combining said modulated outputs, means for demodulating said combined modulated outputs to obtain the modulation components thereof, indicator means, and means for applying said modulation components to said indicator means for indicating the direction of said craft.

3. A receiving system for pulse energy radiated from a remote craft to be guided along a prescribed course, comprising two antennas spaced apart a given fraction of a wave length at a sub-carrier frequency and mounted one on each side of said course, means for separately demodulating the pulses received by each of said antennas to obtain the sub-carrier frequency components thereof, means for combining each of said demodulated outputs to provide sum and difference component outputs thereof, means for providing a phase displacement between each of said component outputs, a source of modulating waves, means for applying said waves in given phase relationship for separately modulating each of said combined outputs after said phase displacement, means for combining said two modulated outputs, means for demodulating said combined modulated outputs to obtain the modulation components thereof, indicator means, and means for applying the modulation components to said indicator means for indicating the direction of said craft.

4. An arrangement according to claim 2, wherein said phase displacement comprises a 90° phase displacement.

5. An arrangement according to claim 3, wherein said phase displacement comprises a 90° phase displacement.

6. A receiving system for pulse energy radiated from a remote craft to be guided along a prescribed course comprising two antennas spaced apart a given fraction of a wave length at a sub-carrier frequency and mounted one on each side of said course, means for separately receiving and demodulating the pulse energy received by each of said antennas to obtain the sub-carrier components thereof, means for combining each of said demodulated outputs to provide distinct sum and difference component outputs thereof, means for providing a phase displacement between said component outputs, means for combining said component outputs after said phase displacement to provide sum and difference component outputs thereof, a source of separate modulation waves, means for modulating each of said last named sum and difference component outputs with separate ones of said modulation waves, means for combining said modulated waves, means for demodulating said modulated waves to obtain the modulation components thereof, indicating means, and means for applying each of said modulation components to said indicator means for indicating the direction of said craft.

7. A receiving system for pulse energy radiated from a remote craft to be guided along a prescribed course comprising two antennas spaced apart a given fraction of a wave length at a sub-carrier frequency and mounted one on each side of said course, means for combining the pulse energy received by each of said antennas to provide sum and difference component outputs thereof, means for providing a phase displacement between said component outputs, a source of separate modulation waves, means for modulating one of said component outputs after said phase displacement with said modulation waves of a given phase, means for deriving two separate outputs from the other of said component outputs after said phase displacement, means for modulating one of said separate outputs, and the other of said separate outputs being phase displaced and then modulated by separate ones of said modulation waves, means for combining all of said modulated outputs, means for demodulating said combined outputs to obtain the sub-carrier components thereof, means for demodulating said sub-carrier components to obtain the modulation components thereof, indicator means, and means for applying said modulation components to said indicator means for indicating the direction of said craft.

8. A receiving system for pulse energy radiated from a remote craft to be guided along a prescribed glide path course, comprising two antennas spaced apart in the vertical a plurality of wave lengths at the carrier frequency of said pulse energy, means for combining the pulse energy received by each of said antennas to obtain sum and difference component outputs thereof, a source of separate modulation waves, means for modulating each of said component outputs with separate ones of said modulation waves, means for combining said modulated outputs, means for demodulating said combined modulated outputs to obtain the modulation components thereof, indicating means, and means for applying said modulation components to said indicating means for indicating the direction of said craft.

9. An arrangement as set forth in claim 6, wherein said pulse energy radiated from said craft comprises reradiated pulse energy, means located at said course for transmitting pulse energy to said craft for reradiation from said craft, a cathode ray oscillograph, a sweep generator for said oscillograph, means for applying a synchronizing signal from said source of pulse energy to control the operation of said sweep generator, means for applying the output of one of said receiving means to control the indication of said oscillograph, a range cursor on said oscillograph, an adjustable gating circuit for controlling release of energy to said means for demodulating energy and a mechanical coupling between said cursor and said gating circuit.

ANTHONY CASABONA.
GUS STAVIS.

REFERENCES CITED

The following references are of record in the file of this patent:

UNITED STATES PATENTS

| Number | Name | Date |
|---|---|---|
| 2,405,238 | Seeley | Aug. 6, 1946 |
| 2,418,143 | Stodola | Apr. 1, 1947 |
| 2,426,218 | Hopgood | Aug. 26, 1947 |
| 2,427,660 | Cotton | Sept. 23, 1947 |
| 2,428,966 | Gage | Oct. 14, 1947 |
| 2,433,991 | Hebb | Jan. 6, 1948 |
| 2,451,823 | Guanella | Oct. 19, 1948 |
| 2,456,666 | Agate | Dec. 21, 1948 |
| 2,468,090 | Lundburg | Apr. 26, 1949 |